United States Patent
Stethem

[11] 3,771,290
[45] Nov. 13, 1973

[54] VORTEX DE-AERATOR
[75] Inventor: Walter C. Stethem, Toronto, Ontario, Canada
[73] Assignee: S. A. Armstrong Limited, Toronto, Ontario, Canada
[22] Filed: Dec. 6, 1971
[21] Appl. No.: 205,188

[52] U.S. Cl. .................. 55/205, 210/304, 210/312, 210/512
[51] Int. Cl. ...................... B01d 19/00, B01d 53/24
[58] Field of Search ................ 55/39, 52, 185, 191, 55/204, 205, 336, 206; 210/304, 312, 436, 512

[56] References Cited
UNITED STATES PATENTS
2,578,568  12/1951  Mayer et al. .......................... 55/205
1,925,491   9/1933  Lorraine .......................... 55/204 X
2,443,875   6/1948  Spangenberger ................ 55/204 X
3,151,961  10/1964  Blackmore et al. .................... 55/205
1,103,628   7/1914  Spencer .............................. 55/336

Primary Examiner—Frank A. Spear, Jr.
Assistant Examiner—Richard W. Burks
Attorney—J. A. Legris

[57] ABSTRACT

In a vortex type de-aerator for separating air and other gases from a flowing liquid, having a central perforate tube located within a vessel having a tangential inlet and a tangential outlet, a vortex stabilising baffle device is located adjacent to the inlet for stabilising the vortex flow and for shielding separated gas from any disturbances at the inlet.

5 Claims, 3 Drawing Figures

PATENTED NOV 13 1973 3,771,290

VORTEX DE-AERATOR

This invention relates to a vortex type de-aerator for the separation of air and other gases from a flowing liquid. The invention is applicable to circulatory systems such as, for example, hot water heating systems.

A well known method of separating gas from a flowing liquid in a circulatory system is to create a vortex of the liquid within a closed vessel and to separate the gas at the vortex core onto a central perforate tube or screen which communicates at its upper end with a gas outlet.

It is an object of the present invention to provide a de-aerator of the vortex type which is particularly simple in construction and efficient in operation.

According to the invention there is provided a vortex type de-aerator for separating air and other gases from a flowing liquid, comprising a hollow body of circular interior cross section having a substantially vertical axis, a perforate tube extending axially the full length of the body and communicating at its upper end with an air outlet, perforate partition means mounted within the body and defining therein upper and lower compartments, means defining a tangential inlet and a tangential outlet to said lower compartment whereby to provide rotating flow of liquid therebetween, the tangential inlet and the tangential outlet being axially spaced and the tangential inlet being disposed adjacent to said partition means, a skirt depending from said partition means and surrounding the perforate tube, and an annular baffle plate connected to the lower end of the skirt at a level below the tangential inlet and above the tangential outlet.

The partition, skirt and baffle plate form means to stabilise the vortex and its radial velocity gradient. By establishing optimum vortex conditions at the outset it is possible for gas separation to continue uninterrupted throughout the length of the lower compartment.

The upper compartment constitutes a recirculation space which is separated from the lower compartment, or main separation chamber, by the perforate partition means. Any aerated liquid arriving in the recirculation space after incomplete separation by the vortex action in the lower compartment will slowly move radially outwards across the recirculation space and encourage further gas separation. The liquid will then pass through the perforate partition means, completely de-aerated, and back into the lower compartment to complete the cycle. Such recirculation occurs simultaneously with, and independently from, the normal vortex action, and as a result a more complete separation can occur in a given time.

According to a further feature of the invention, a frusto conical screen is mounted within the body, the screen defining within the lower compartment an annular space to which liquid must pass through the screen, the tangential outlet communicating with the annular space.

In order that the invention may be readily understood, one embodiment thereof will now be described by way of example with reference to the accompanying drawings in which.

Figure 1:
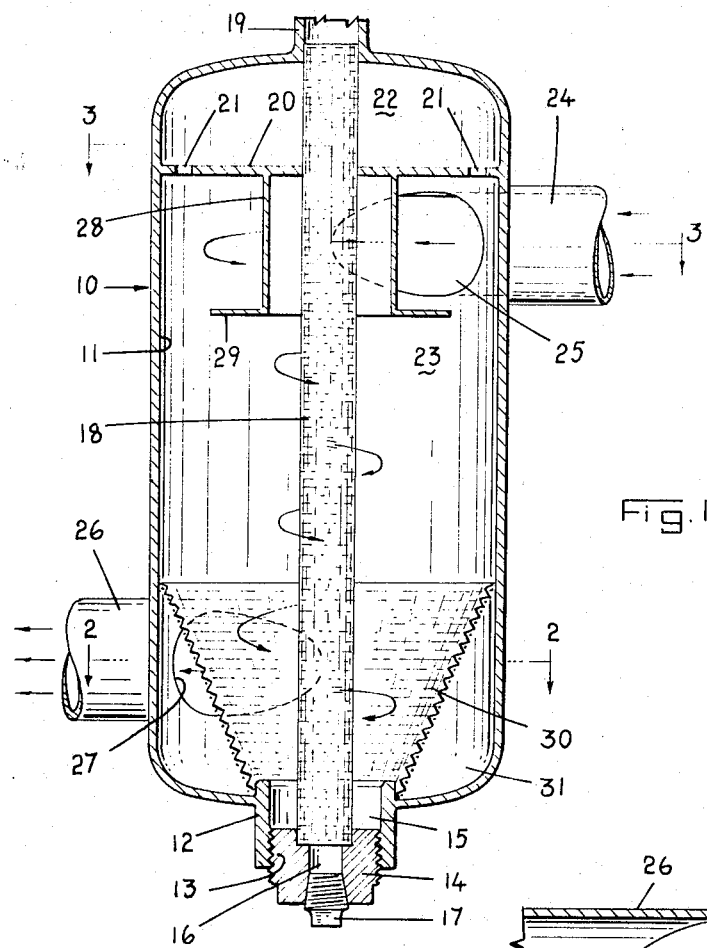
FIG. 1 is a sectional elevation taken through the axis of a vortex type de-aerator according to the invention.
Figure 2:
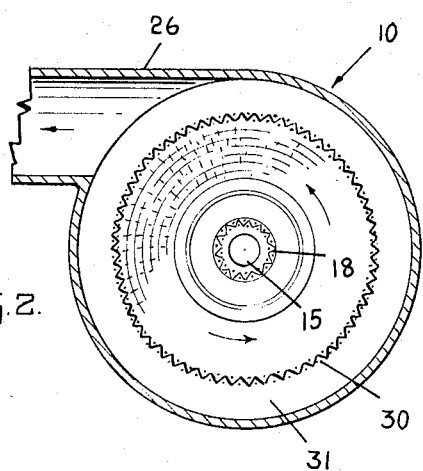
FIG. 2 is a section on line 2—2 in FIG. 1.

Referring to the drawings, the de-aerator comprises a hollow body 10 of circular interior cross section providing a generally cylindrical internal wall 11. The axis of the body is vertical. At the bottom end of the body is a cylindrical skirt 12 which defines an axially located bottom opening. The skirt is internally screw threaded as indicated at 13, and a plug 14 threadedly engages the skirt to form a removable closure for the bottom opening and to define a well 15. The closure 14 has an axial passage 16, which is closed by a second removable plug 17. A perforate tube 18, standing at its lower end in a shallow recess on the upper face of the plug 14, extends axially the full length of the body and communicates at its upper end with an air outlet 19 to which an air line can be coupled.

Figure 3:
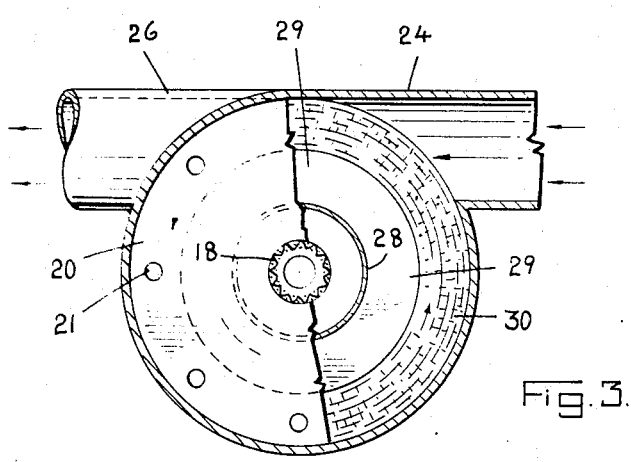
FIG. 3 is a section on line 3—3 in FIG. 1.

An annular plate 20 is connected at its periphery to the inner wall 11 of the body, and extends horizontally from the perforate tube 18 to said inner wall. The plate 20 is formed with a number of ports 21 near its outer periphery. The plate 20 constitutes a horizontal, perforate partition defining an upper compartment 22, or recirculation space, and a lower compartment 23, or separation chamber. A first pipe fitting 24 is connected to the body 10 to provide a tangential inlet 25 below and adjacent to the annular plate 20. A second pipe fitting 26 is connected to the body to provide a tangential outlet 27 which is axially spaced from the inlet 25 and at a lower level. When viewed in plan, i.e., as viewed in FIG. 3, the pipe fittings 24 and 26 are in line and so provide a rotating flow of liquid through the separation chamber 23 between the inlet 25 and outlet 27. To stabilise this rotating flow, a vortex stabilising device is provided. This device comprises a cylindrical skirt 28 depending from the annular plate 20 and surrounding the perforate tube 18, and an annular baffle plate 29 connected to the lower end of the skirt 28. As seen in FIG. 1, the baffle plate 29 is disposed at a lower level than the inlet 25 and at a higher level than the outlet 27, and is of smaller diameter than the annular plate 20 so as to provide free passage of the rotating liquid between the inlet and the outlet.

Mounted within the lower compartment 23 is a frusto conical screen 30 whose lower edge is located by the cylindrical skirt 12 and whose upper edge engages the cylindrical wall 11 of the body 10. The screen 30 defines an annular space 31 communicating with the outlet 27. The screen is located so that any solid matter carried by the liquid is intercepted as the liquid flows into the annular space 31.

In operation of the device, the inlet flow of liquid is guided and controlled by the baffle device 28, 29. This device ensures that the maximum tangential inflow velocity is kept towards the inner wall 11 of the separation chamber, remote from the chamber axis. In this way, the vortex created has a maximum radial velocity gradient such that the tangential velocity adjacent to the central perforate tube will be a minimum, thus providing ideal gas separation conditions. The vortex, when so established, will move downwards in a continuous swirling motion over the plate 29. The plate 29 not only serves to stabilise the swirl or vortex by minimising its tendency towards radial shift, but isolates the vortex, once established, from disturbances at the inlet 25.

The vortex proceeds uninterrupted down the separation chamber to the outlet 27. Any entrained gas, together with heavily aerated liquid separated by vortex action, will collect on the perforate tube 18 and rise into the recirculation space 22, which is isolated from the main separation chamber by the plate 20. The flow of separated gas and heavily aerated liquid through the tube 18 is shrouded by the skirt 28 from any disturbances around the inlet 25.

The recirculation space 22 is virtually vortex free. At the periphery of the plate 20 there is a high pressure drop across the ports 21 between the recirculation space and the separation chamber. This pressure drop causes the water to enter back into the main separation chamber, thereby completing a full cycle and at the same time encouraging a through flow in the direction of air migration through the perforate tube 18. The water in the space 22 slowly moves radially outwards across the chamber, such movement encouraging further air separation. Final collection of air is through the air outlet 19. The screen or strainer 30 is of expanded metal and is preferably fixed around its top edge to the inner wall 11 of the body 10. The disposition of the screen 30 is such that the maximum amount of screen surface area is exposed to the full free flow of liquid. Furthermore, the shape of the screen 30 is such that it approximates to the separation parabola, i.e., the shape assumed by the free water surface within the vortex as it exists in the separation chamber. This causes any particles of debris smaller than the size of the screen openings to impinge upon the screen at a low angle of incidence and to be deflected back towards the center of the separation chamber. Precipitation is thus encouraged in the region of the separation chamber below the tangential outlet 27, where the turbulence is small. The precipitated debris collects in the well 15.

Periodic cleaning of the screen 30, as well as complete withdrawal of the perforate tube 18, are facilitated simply by the removal of the plug 14. In the event of a blowdown, the inner plug 17 need only be removed.

What I claim as my invention is:

1. A vortex type de-aerator for separating air and other gases from a flowing liquid, comprising
   a hollow body of circular interior cross section having a substantially vertical axis,
   a perforate tube extending axially the full length of the body and communicating at its upper end with an air outlet,
   perforate partition means mounted within the body and defining therein upper and lower compartments,
   said partition means comprising a horizontal annular plate having ports disposed radially outwardly from the tube for the return of liquid from the upper compartment to the lower compartment,
   means defining a tangential inlet and a tangential outlet to said lower compartment whereby to provide rotating flow of liquid therebetween,
   the tangential inlet and the tangential outlet being axially spaced and the tangential inlet being disposed adjacent to said partition means,
   a skirt depending from said partition means and surrounding the perforate tube, and
   an annular baffle plate connected to the lower end of the skirt at a level below the tangential inlet and above the tangential outlet.

2. A vortex type separator according to claim 1 including a frusto-conical screen mounted within the body, the screen defining within the lower compartment an annular space to which liquid must pass through the screen, said tangential outlet communicating with the annular space.

3. A vortex type de-aerator for separating air and other gases from a flowing liquid, comprising
   a hollow body of circular interior cross section having a substantially vertical axis and a cylindrical inner wall,
   a perforate tube extending axially the full length of the body and communicating at its upper end with an air outlet,
   a perforate annular plate extending horizontally from the tube to said inner wall, the plate being connected to the inner wall of the body and defining upper and lower compartments therein,
   said annular plate providing perforations disposed radially outwardly from the tube for the return of liquid from the upper compartment to the lower compartment,
   a first fitting defining a tangential inlet to said lower compartment and a second fitting defining a tangential outlet to said lower compartment, whereby to provide rotating flow of liquid between said tangential inlet and outlet,
   the tangential inlet and outlet being axially spaced and the tangential inlet being disposed adjacent to said annular plate,
   A cylindrical skirt depending from the annular plate and surrounding the perforate tube, and
   an annular baffle plate of smaller diameter than said perforate annular plate connected to said skirt at a level below the tangential inlet and above the tangential outlet.

4. A vortex type separator according to claim 3, wherein the body is formed with an axially located bottom opening fitted with a removable closure, whereby to provide access to the interior of the body.

5. A vortex type de-aerator according to claim 3, including a frusto-conical screen located within said lower compartment and defining an annular space communicating with said tangential outlet, the screen being positioned to intercept solid matter contained in the liquid flowing to said tangential outlet.

* * * * *